United States Patent [19]

Ray

[11] 4,019,781
[45] Apr. 26, 1977

[54] HYDRAULIC HOIST FOR PICKUP BED

[76] Inventor: Louis M. Ray, 11027 Ferguson Road, Dallas, Tex. 75228

[22] Filed: Nov. 10, 1975

[21] Appl. No.: 630,290

[52] U.S. Cl. .......................... 298/22 J; 298/17 R; 296/28 D
[51] Int. Cl.² ......................................... B60P 1/16
[58] Field of Search ............ 298/22 J, 22 R, 17 R; 296/10, 28 D

[56] References Cited

UNITED STATES PATENTS

| | | | |
|---|---|---|---|
| 3,043,629 | 7/1942 | Schlueter | 298/22 J |
| 3,600,038 | 8/1971 | Jones | 298/17 R X |
| 3,833,261 | 9/1974 | Dingler | 298/22 R X |

*Primary Examiner*—Robert J. Spar
*Assistant Examiner*—George F. Abraham
*Attorney, Agent, or Firm*—Richards, Harris & Medlock

[57] ABSTRACT

The specification discloses an attachment for converting a fixed bed truck with a passenger cab and hauling bed supported on a frame to a tilting bed truck. The attachment permits the rotation of the truck bed from a horizontal to a tilt position, such that the truck cab and bed, when the bed is in the horizontal position, assumes the same relative relationship as before the conversion. The attachment includes at least two hinges fixedly attached between the underside of the hauling bed and the rear of the truck frame to permit relative rotation between the hauling bed and frame. A first arm is pivotally connected at one of its ends to the forward portion of the frame and extends forwardly from the frame. A second arm is pivotally connected at one of its ends to the underside of the truck bed adjacent the forward end thereof and extends forwardly from the truck bed. A coupling member is pivotally connected at its opposite ends between the other ends of the first and second arms. A variable length actuator arm is interconnected between the first and second arms for exerting a lifting force between the frame and second arm when the actuator arm is contracted. When the actuator arm is extended, the second arm is moved substantially longitudinally against the truck bed to tilt the bed rearwardly. For retracting the truck bed, the actuator arm is contracted thereby causing the second arm to move downwardly with the first arm and coupling member.

10 Claims, 8 Drawing Figures

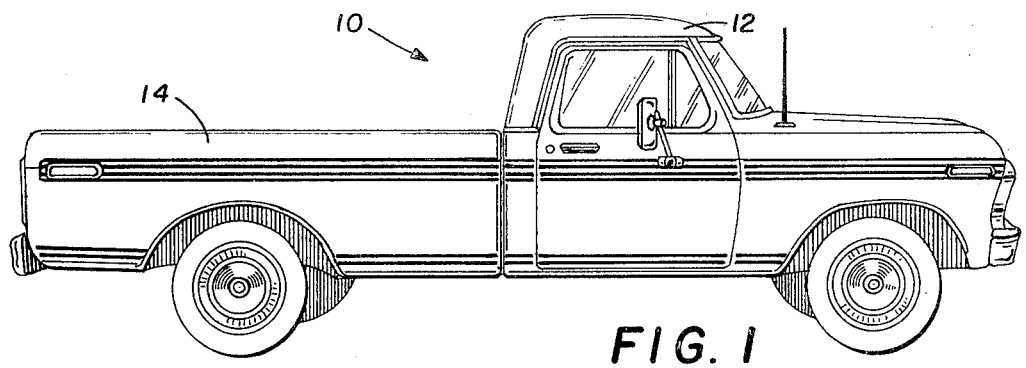
FIG. 1
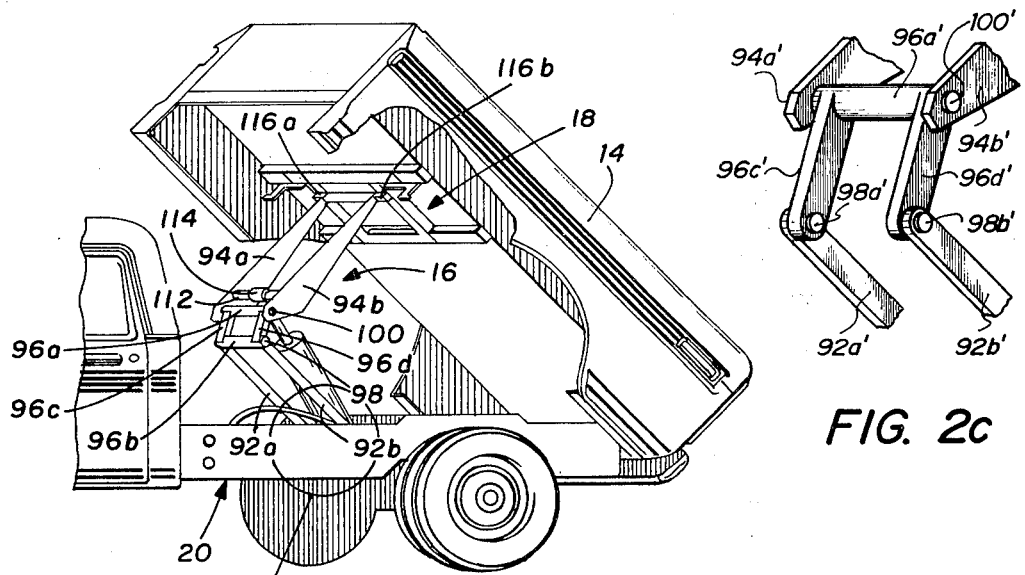
FIG. 2a
FIG. 2c
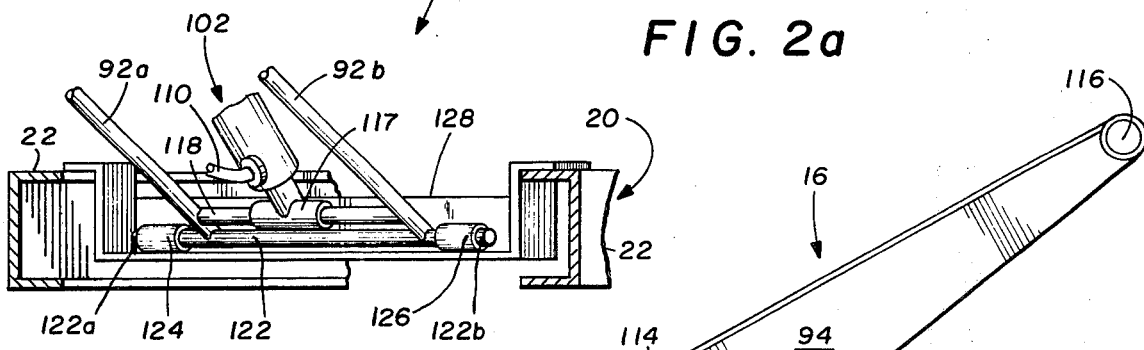
FIG. 2b
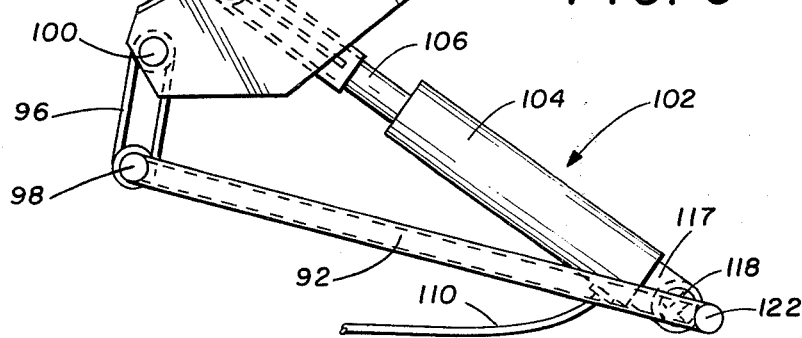
FIG. 6

HYDRAULIC HOIST FOR PICKUP BED

BACKGROUND OF THE INVENTION

1. Field of the Invention

This invention relates to a method and apparatus for converting a standard fixed bed pickup truck to a tilting bed truck, and more particularly, to a geometrically improved lifting hoist mechanism for converting a fixed bed pickup truck to a tilting bed truck such that the relationship of the pickup bed to the passenger cab remains unchanged after the conversion.

2. Prior art

The advantages in having a truck with the capability of selectively tilting the truck bed or hauling box to facilitate removal of materials transported thereon has resulted in a number of systems of providing such a feature. The systems heretofore used have been primarily of two types. The first is characterized by a truck bed hinged at the rear of the truck frame and hoisted or tilted by the actuation of a hydraulic ram or other variable length arm connected directly between the forward end of the truck bed and truck frame. In order to accommodate the lifting ram and permit the truck bed to be positioned adjacent the truck frame when in the horizontal position, the lifting ram in these systems is normally exposed either within or without of the hauling bed, thus introducing the substantial disadvantage of having the lifting ram exposed when not in use. Alternatively, the lifting ram is positioned below the truck bed with the bed substantially raised above its normal design position or with the ram so positioned as to introduce very inefficient leverage as it functions to tilt the truck bed.

A second type of lifting mechanism has been employed wherein a hydraulic ram is used to extend a folded linkage consisting of two or three interconnected members. By extending the uppermost member, the truck bed is raised to the tilted position. Examples of this type of system are found in U.S. Pat. No. 3,617,090, issued to Samuel E. Huffman and U.S. Pat. No. 3,043,629, issued to D. H. Schlueter, et al. In each of these configurations, the truck bed is tilted by extending the upper arm by use of a hydraulic ram acting between the lower arm and the upper arm. While this configuration introduces the advantage of a folding scissor-type lift mechanism which collapses below the truck bed, lifting of the bed by extending the upper arm against the underside of the truck bed introduces substantial loading including stresses due to a considerable bending moment applied to the upper arm. Further, the prior art units fail to disclose a method for simply and quickly altering a fixed bed truck for the installation of tilting mechanisms without altering the relationship between the truck bed and the frame and passenger cab of the truck. Moreover, the prior art systems have failed to disclose a simple conversion system which does not require extensive alteration to the truck frame or bed and which does not effect either the structural or operating vehicle components such as the drive shaft, muffler and other original parts in converting the truck from a fixed bed to a tilting bed vehicle.

SUMMARY OF THE INVENTION

The present invention provides a system for overcoming many of the disadvantages found in the prior art and specifically provides a system for converting a fixed bed to a tilting bed pickup truck without substantial alterations to the vehicle frame or truck bed. Further, the present system is readily adaptable to many types of trucks without regard to the particular configuration of the frame or truck bed and without requiring alteration or removal of original structural or operational components. Further, the present system provides a conversion system wherein the relationship between the truck bed and passenger cab and frame are unchanged by the conversion. Most importantly, the present system includes a more efficient geometrical lifting configuration with respect to the arrangement of the lifting linkages used to tilt the truck bed than those found in the prior art systems.

In accordance with the present invention, the attachment for converting a fixed bed truck, having a passenger cab and hauling bed supported on a frame, to a tilting bed truck comprises hinges fixedly attached to the underside of the hauling bed adapted for rotatable engagement with the rear of the truck frame. A first arm is pivotally connected at one of its ends to the forward portion of the frame and extends forwardly from the frame. A second arm is pivotally connected at one of its ends to the underside of the truck bed adjacent the forward end thereof and extends forwardly from the truck bed. A coupling member is pivotally connected at its opposite ends between the other ends of the first and second arms. A variable length hydraulic ram is interconnected between the first and second arm and exerts a lifting force against the second arm when the hydraulic ram is contracted. In that the linkage arms are extended by the retraction of the hydraulic ram, the second arm follows a path defined by the extension of its longitudinal axis thereby primarily subjecting the arm to axial loads and minimizing bending stresses. The second arm is directed against the underside of the truck bed and tilts the bed rearwardly. The truck bed is lowered when the hydraulic ram is retracted causing the second arm to fold downwardly with the first arm and coupling member. The folded linkage arms nest under the truck bed to permit the bed to assume a horizontal position.

In accordance with another aspect of the invention, the hinges about which the truck bed tilts each comprise a longitudinal member fixedly attached to the underside of the truck bed. A first plate member having an aperture therein extends outwardly from the the bottom of the truck bed and is rigidly attached to the longitudinal member. A second plate member having an aperture therein is fixedly attached to the truck frame. The aperture in said second plate member is alignable with the aperture in said first plate member and a pin inserted through the apertures completes the hinge by permitting relative rotation between the first and second plate members.

In accordance with another aspect of the invention, the first arm includes spaced parallel lever members joined at one end by the coupling member. A rigid shaft is fixedly attached intermediate of the ends of the lever members. Cylindrical ears extend perpendicularly from the opposite ends of the lever member and are adapted to engage channel members fixedly attached to the longitudinal sides of a rectangular frame attached to the underside of the truck bed. The load exerted on the lever members is directed by way of the cylindrical ears to the rectangular frame and thus to the truck bed. The receptacle formed by the channel members is kept in constant contact with the mating cylindrical ears by the normal tendency of the truck bed to move downwardly under the action of gravity. In accordance with this embodiment, the second arm includes spaced lever members rotatably connected between the truck frame and coupling member.

DESCRIPTION OF THE DRAWINGS

For a more complete understanding of the present invention, and for further objects and advantages thereof, reference is now made to the following description taken in conjunction with the accompanying drawings in which:

FIG. 1 illustrates a pickup truck embodying the present invention with the truck bed in the horizontal position;

FIG. 2a is a perspective view, partially cut-away, of a pickup truck embodying the present invention wherein the truck bed is tilted rearwardly;

FIG. 2b is an enlarged perspective view showing the connection between the lift mechanism and truck chassis;

FIG. 2c is an enlarged perspective view showing an alternative embodiment of the lift mechanism;

FIG. 6 illustrates a side view of the lift mechanism used in the present invention to tilt the truck bed.

DESCRIPTION OF THE PREFERRED EMBODIMENTS

Figure 4:
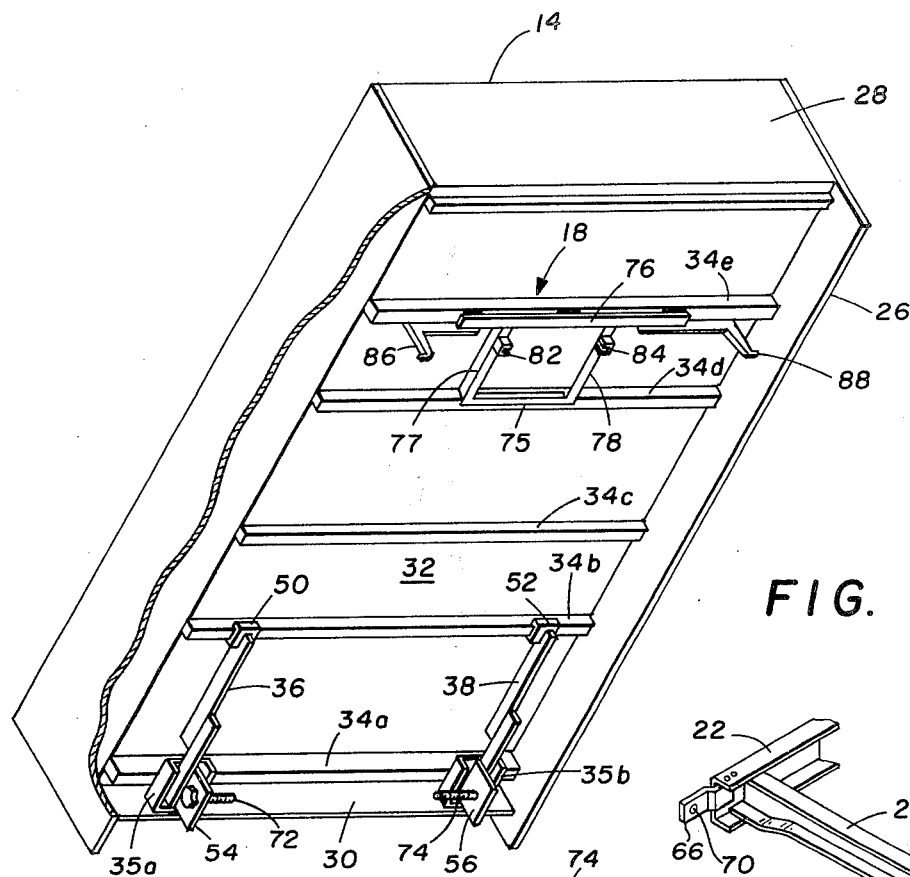
FIG. 4 is a perspective view, partially cut-away, of the underside of the truck bed adapted in accordance with the present invention.

FIG. 1 illustrates a standard pickup truck embodying the present invention. The truck, indicated generally by the reference numeral 10 comprises a passenger cab 12 and a rear hauling bed or box 14. It will be observed that in the present invention, the conversion of a fixed bed truck to a tilting bed truck does not alter the relationship of the truck bed to the passenger cab when the bed is in the horizontal position as illustrated in FIG. 1.

Figure 3:
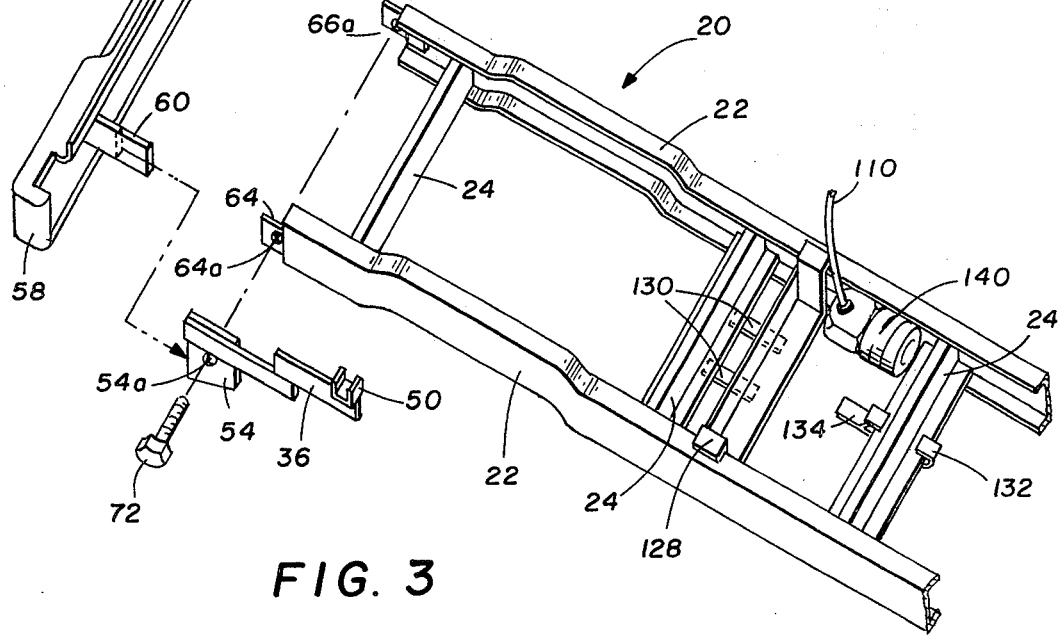
FIG. 3 illustrates in perspective view modifications to the truck chassis for application of the present invention.

FIG. 2a illustrates in perspective view and partially cut-away, the truck bed 14 tilted rearwardly by lifting mechanism 16 acting between a rectangular frame 18 fixed to the underside of bed 14 and chassis 20 to which the lifting mechanism is attached. It may be seen in FIG. 2a that truck bed 14 hinges rearwardly about a point at the rear of chassis 20. As is best seen in FIG. 3, truck chassis 20 includes longitudinal channel frames 22 joined by transverse frame members 24. FIG. 4 illustrates in perspective view the underside of truck bed 14 and shows side walls 26, a front wall 28, a rear section 30 and a floor 32. Floor 32 is supported by transverse floor supports 34a–e attached to floor 32 and side walls 26 by suitable means, such as by welding. Frame attachment fittings 35a and 35b are rigidly affixed to transverse support member 34a and rear section 30. These fittings normally mate with longitudinal channel frames 22 to join the truck bed to the chassis.

In converting a fixed bed truck to the tilting bed vehicle of the present invention, truck bed 14 is detached from chassis 20 by removing all fasteners and other means of attachment between the bed and chassis. Thereafter, the following modifications are made to the truck bed and chassis. Referring to FIG. 4, load distributing members 36 and 38 are fixedly attached between transverse floor support 34b and frame attachment fittings 35a and 35b near the rear of truck bed 14 on the underside thereof. Load distributing members 36 and 38 may be made from two pieces of bar stock of sufficient dimension to allow for a step-up or step-down between varying sizes of floor supports 34. In the particular case illustrated, floor support 34a extends below that of floor support 34b, and frame attachment fittings 35a and 35b are attached to the lower face of floor support 34a thereby introducing an additional offset between the forward and rearward points of attachment of floor members 36 and 38. The load distributing members 36 and 38 are formed in two sections, namely 36a and 36b and 38a and 38b, respectively, to provide for flat surface contact between load distribution members 36 and 38 and transverse floor support 34b and frame fittings 35a and 35b.

The forward end of load distributing members 36 and 38 are provided with relatively short channel sections 50 and 52 which are adapted to mate with transverse support 34b. Channel sections 50 and 52 are suitably attached to load distributing members 36 and 38 as by welding.

Figure 5:
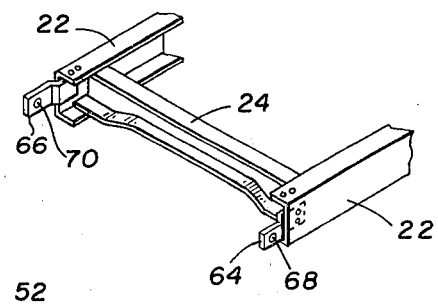
FIG. 5 illustrates in perspective view the end of the truck frame modified in accordance with the present invention to provide for hinging of the truck bed from the truck frame.

Hinge plate members 54 and 56 are similarly rigidly attached, as by welding, to the opposite end of load distributing members 36 and 38, respectively. Plate members 54 and 56 have apertures 54a and 56a therein and are attached to load distributing members 36 and 38 such that the top edges are flush to facilitate attachment of the combined hinge plate-load distributing members to frame fittings 35a and 35b. Attachment of members 54 and 56 and 36 and 38 to frame fittings 35a and 35b, respectively, is by any suitable method, as for example, by welding. Simultaneously, the forward end of load distributing members 36 and 38, by way of channel sections 50 and 52, are fixedly attached to transverse support member 34b as by welding Referring to FIG. 3, rear bumper 58, normally bolted to frame 22 by way of extensions 60, is removed in the conversion process. Referring to FIGS. 3 and 5, hinge plates 64 and 66 are attached, as by welding, to the back of channel frame 22. Hinge plates 64 and 66 are adapted with apertures 64a and 66a and are formed such that the outer faces thereof are flush with the outer face of the backs of channels 22. In this way, the outer surfaces of the hinge plates 64 and 66 form a planer surface with the outer faces of channel frames 22. The dimension between the outer faces of hinge plates 64 and 66 is approximately equivalent to the dimension between the inside faces of hinge plate members 54 and 56 such that the inner faces of hinge plate members 54 and 56 are adjacent the outer faces of hinge plates 64 and 66 when bed 14 is positioned for mounting on chassis 20. Likewise, apertures 54a and 56a within hinge plates 54 and 56 are alignable with apertures 64a and 66a in hinge plates 64 and 66. When aligned, pins 72 and 74 are inserted therein providing a hinge about which bed 14 may pivot.

Alternatively, hinge plates 64 and 66 may be constructed from flat plates with their outer faces flush with the inner faces of the backs of channel frames 22. In this configuration, the dimension between the outer faces of hinge plates 64 and 66 and the inner faces of hinge plates 54 and 56 may vary slightly due to the difference in thickness of channel 22, depending on the make and model of the truck being used.

Extensions 60 and 62 extending from bumper 58 are trimmed and, as so modified, are fixedly attached to hinge plate members 54 and 56, respectively. In this way, bumper 58 will rotate with hinge plate members 54 and 56 as bed 14 is tilted.

Referring to FIG. 4, rectangular frame 18 is adapted to the underside of bed 14 to receive and distribute the loading from the lifting mechanism 16 to transverse floor supports 34d and 34e. Rectangular frame 18 is composed of two transverse sides 75 and 76 spaced by longitudinal sides 77 and 78. The frame is securely attached to transverse floor supports 34d and 34e by suitably attaching members 75 and 76 thereto as by welding. Longitudinal sides 77 and 78 are adapted with relatively short channel sections 82 and 84 to form a receiving area therein.

Also attached to transverse floor support 34e are guides 86 and 88 which extend perpendicularly from the bottom of bed 14 and which are positioned to guide the bed onto frames 22 as the bed moves from the upright to the horizontal position.

Referring to FIGS. 2a and 6, the lifting mechanism 16 of the present invention consists of two movable levers 92 and 94 interconnected by coupling member 96. In the primary embodiment of the invention, lifting mechanism 16 is a subassembly as shown in FIG. 6 which is attached between the truck chassis and bed. Lever 92 is pivotally attached at pin 98 to coupling member 96. In turn, the opposite end of coupling member 96 is rotatably attached at pin 100 to lever 94. Interconnected between lever 94 and lever 92 is hydraulic ram 102. Ram 102 includes a cylinder 104 and movable piston arm 106. Hydraulic fluid line 110 carries fluid to and from the unit to provide for extending and retracting piston arm 106.

Referring again to FIG. 2a, lever 92 includes two arms 92a and 92b joined at their upper ends by coupling member 96. While arms 92a and 92b are illustrated as and will be referred to as cylindrical, it will be understood that these arms may likewise be formed from rectangular or channel members. Coupling member 96 is a rectangular framed member including transverse sleeve members 96a and 96b interconnected by side members 96c and 96d. The rotatable joint between arms 92a and 92b and sleeve member 96b of coupling 96 is by way of pin 98 affixed to arms 92a and 92b and passing through sleeve member 96b. Lever member 94 also consists of two arms 94a and 94b rotatably connected to sleeve member 96a of coupling member 96 by pin 100 affixed to arms 94a and 94b and passing through sleeve member 96a. Each of the axes of rotation between the various linkages in lifting mechanism 16 are parallel one to the other to permit free rotation of the linkages during the operation of the system.

Intermediate of the ends of arms 94a and 94b is load bar 112 which rotatably accepts the end of the piston 106 of ram 102 at coupling 114. The opposite ends of arms 94a and 94b are adapted with ears 116a and 116b extending perpendicularly therefrom. Ears 116a and 116b mate within the channels 82 and 84 attached to frame 18 on the underside of the truck bed, as is shown in FIG. 2a.

Referring to FIG. 2b, ram 102 is connected at its opposite end to a rotatable fitting 117 movable about a transverse bar 118 rigidly connected between the lower ends of cylindrical arms 92a and 92b. cylindrical arms 92a and 92b of lifting mechanism 16 are connected to chassis 20 at cylindrical end member 122 which is interconnected between the ends of arms 92a and 92b. Member 122 extends outside arms 92a and 92b to form extensions 122a and 122b which are rotatably received by collar brackets 124 and 126 attached to mounting bracket 128. Mounting bracket 128 is in turn rigidly attached to channel frames 22 by welding or other suitable means and to transverse frame member 24 by straps 130. Attached to the forward transverse frame member 24e is hoist support arm 132 which has an extension 134 on which sleeve 96b of coupling 96 rests when lifting mechanism 16 is in its lowered position.

It may also be observed that arms 94a and 94b are chamfered to permit arms 94a and 94b to nest closely to lower levers 92 when lifting mechanism 16 is in the retracted position.

Electric motor 140 is mounted within channel frame 22 and below the retracted position for the lifting mechanism. Electric motor 140 supplies the needed flow of hydraulic fluid through line 110 and a suitable valve (not shown) to hydraulic ram 102 for operation of the lift mechanism.

When the operator of the truck wishes to tilt the hauling bed 14, motor 140 is energized by the appropriate movement of a switch within the passenger cab. Hydraulic fluid is pumped through line 110 and into the rearward cylinder chamber of hydraulic ram 102, causing hydraulic piston arm 106 to be extended. The extension of piston arm 106 forces the unfolding of upper arms 94a and 94b and the simultaneous rotation of cylindrical arms 92a and 92b at strap brackets 126. This movement results in the tilting of bed 14.

It is noted that both cylindrical arms 92a and 92b and arms 94a and 94b extend from their points of connection between the truck frame and truck bed forwardly and that the extension of the lift mechanism is by extending piston arm 106, thereby forcing the lift mechanism to unfold. Because of this particular geometric arrangement, it will now be appreciated that the loading experienced by upper arms 94a and 94b is substantially radial as the lift mechanism unfolds, this being diagrammatically illustrated in FIG. 2a. Therefore, after the initial rotation of lifting mechanism 16, and particularly at the upper tilt angles, loading on arms 94a and 94b is primarily radial, thereby eliminating substantial bending stresses which would otherwise be introduced into these components.

This feature of the invention is highly significant in that the upper arms of multi-linkage lift mechanisms are the only linkages in which substantial bending stresses may be introduced in that these arms experience loading intermediate of their ends with the ends rigidly hinged between the truck bed and coupling member to the lower arm. Both the coupling member and lower arm members receive only axial and torsional loading in that each structure is pinned at its end without any intermediate loading as in the case with the upper lever arms. Therefore, this geometric arrangement substantially reduces the bending stresses introduced into the upper lever arms and permits smaller structural elements to be used while increasing ultimate capability of the lift mechanism.

As piston arm 106 of hydraulic ram 102 is extended, and lifting mechanism 16 unfolded, the bed is tilted to facilitate unloading of cargo therein. When the bed has reached a desired angle of rotation, electric motor 140 may be deenergized by controls within the passenger cab to arrest the movement of the bed. The system may also be provided with an automatic shut-off mechanism which automatically stops the movement of the bed at a pre-selected angle of tilt to prevent overtravel of the lift mechanism. Additionally, hydraulic ram 102 may be so designed such that the piston therein strikes the end gland of the cylinder as the hoist mechanism reaches its extended position. When the hydraulic cylinder reaches this fully extended configuration, the lift mechanism and the tilt of the truck bed is halted.

Lowering of the tilt bed is substantially a reversal of the lift cycle wherein motor 140 is energized by controls within the passenger cab and fluid is released out of cylinder 104 through line 110 by a valve mechanism responsive to the system control switches. Hydraulic fluid released from cylinder 104 is stored in container 144 adjacent motor 140. As hydraulic fluid is released from cylinder 104, piston arm 106 is retracted under the load of truck bed 14, and arms 92a and 92b and 94a and 94b fold into a nesting position below the truck bed. The lifting mechanism 16 is lowered until contact is made between sleeve member 96b of coupling 96 against hoist support arm extension 134. It is again noted that as the lift mechanism is retracted below the truck bed, loading on arms 94a and 94b is substantially radial with significant bending stresses being introduced only in the lower portions of the lift cylcle.

A safety feature is designed into the lift mechanism by use of an orifice valve 148 at the point of connection of fluid line 110 to cylinder 104. Orifice valve 148 is designed to restrict the discharge of fluid from cylinder 104 as to always assure a controlled rate to retraction of piston arm 106 and thus a moderate rate of descent of truck bed 14. Thus, a failure in line 110 will not result in the truck bed falling to its horizontal position, but rather the truck bed will lower gradually as in a normal retraction. In an alternative embodiment, valve 48 is a normally closed, electrically controlled, hydraulic valve which will not permit the flow of fluid therethrough unless the control circuit is activated. In this embodiment, failure of line 110 will not result in the falling of the truck bed.

FIG. 2c illustrates an alternative embodiment of the lift mechanism which permits its use with certain truck models having their drive shafts in a higher orientation relative to the frame structure while still permitting the truck bed to assume its original orientation with respect to the truck cab when the bed is in the horizontal position. As is illustrated in FIG. 2c, coupling member 96' includes a transverse sleeve member 96a' and two side members 96c' and 96d' extending therefrom. The ends of side members 96c' and 96d' remote from transverse sleeve member 96a' are adapted with apertures for receiving pins 98a' and 98b' which hingedly join side members 96c' and 96d' to lever arms 92a', respectively. In this embodiment of the invention, coupling member 96' is void of a corresponding lower sleeve member 96b found in the embodiment of the coupling member 96 of FIG. 2a.

Heretofore, many trucks have been adapted with a two-piece drive shaft with the first element extending from the transmission to a cross-member and the second element extending from the cross-member to the differential. In newer designs, the drive shaft is a single shaft extending directly from the transmission to the differential. This newer design has, however, resulted in the positioning of the drive shaft in a higher orientation relative to the frame structure than in previous designs. In some cases this new design positions the drive shaft several inches above the older configurations.

The absence of lower sleeve member 96b found in the embodiment of FIG. 2a is significant when considering the adaption of the lift mechanism of the present invention to these and similar truck models. The coupling member disclosed in the embodiment illustrated in FIG. 2c permits the lift mechanism to effectively surround the drive shaft extending from the transmission to the differential when in the lowered position.

Further, the embodiment of coupling member 96' illustrated in FIG. 2c makes possible the incorporation of a lift mechanism to a pickup where the drive shaft would otherwise interfere with the mechanism while permitting the truck bed to be positionable in the same original relative orientation with the truck cab when the bed is in the lowered position. Therefore, the present invention discloses a system which may be incorporated in existing trucks without modification to existing structures and without interfering with the original bed-cab orientation.

Thus, the present invention provides a system for converting a fixed bed truck to a tilting bed truck without requiring substantial alterations to the vehicle frame or truck bed. Further, the present system is readily adaptable to many types of trucks without regard to the particular configuration of chassis or truck bed and without requiring alterations of or the removal of original structural or operational components. The conversion system is so designed as to not alter the relationship between the truck bed and passenger cab and frame when adapted to the vehicle. More importantly, the present system includes a more efficient geometrical lifting configuration with respect to the arrangement of the lifting linkages relative to the truck bed and chassis than those systems found in the prior art. The system further provides components necessary to make the conversion adaption while providing for necessary load distribution components necessitated by the dynamic forces introduced into the system by use of the tilting feature.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An attachment for converting a fixed bed truck with a passenger cab and hauling bed supported on a frame to a tilting bed truck where the truck bed may be rotated from a horizontal to a tilt position, such attachment permitting the truck cab and bed, when the bed is in the horizontal position, to assume the same relative relationship as before the conversion, comprising:
    at least two hinges fixedly attached between the underside of the hauling bed and the rear of the truck frame to permit relative rotation between the hauling bed and frame,
    a first arm pivotally connected at one of its ends to the forward portion of the frame and extending forwardly from the frame,
    a second arm pivotally connected at one of its ends to the underside of the truck bed adjacent the forward end thereof and extending forwardly from the truck bed, a coupling member pivotally connected at its opposite ends between said other ends of said first and second arms, a variable length actuator arm interconnected between said first and said second arm for exerting a lifting force between the frame and second arms when said actuator arm is extended such that said second arm is moved substantially longitudinally against said truck bed to tilt the bed rearwardly, and for retracting the truck bed when said actuator arm is retracted by causing said second arm to move downwardly with said first arm and said coupling member.

2. The attachment of claim 1 wherein said actuator arm comprises:

a cylinder having one end connected to said first arm, a piston arm movable within said cylinder and having a portion extending therefrom and connected to said second arm, an orifice valve mounted on said cylinder for receiving fluid into said cylinder to extend said piston arm and second arm to tilt the truck bed and for controlling the discharge of fluid from said cylinder to retract said piston arm and second arm to lower the truck bed, said valve preventing the sudden discharge of fluid from said cylinder thereby preventing sudden dropping of the truck bed.

3. The attachment of claim 2 wherein each said hinge comprises:

a longitudinal member fixedly attached to the underside of the truck bed, a first plate member having an aperture therein and rigidly attached to said longitudinal member, said first plate member extending perpendicularly from the bottom of the truck bed, a second plate member having an aperture therein and fixedly attached to the truck frame, the aperture in said second plate member being alignable with the aperture in said first plate member, and a pin member adapted for insertion through the apertures in said first and second plate members, said pin member being sized to permit relative rotation between said first plate member and said second plate member thereby effectuating a hinge.

4. The attachment of claim 1 wherein said second arm includes spaced second lever members joined at one end by said coupling member, a rigid shaft fixedly attached intermediate of the ends of said second lever members and pivotally attached to said actuator arm, cylindrical ears extending along a common axis from the opposite ends of said second lever members, and further comprising a rigid rectangular frame affixed to the underside of said truck bed, and channel members fixedly attached to said rectangular frame, said channel members forming receptacles for receiving said cylindrical ears such that a load exerted on said second lever members is directed by way of said cylindrical ears to said rectangular frame.

5. The attachment of claim 4 wherein said first arm includes spaced first lever members rotatably connected between the truck frame and said coupling member.

6. The attachment of claim 5 wherein said coupling member includes a transverse member rotatably interconnecting the ends of said spaced lever arms remote from the connection of said spaced lever arms to the truck bed, a pair of side members extending from said transverse member, and means for rotatably connecting the ends of said side members remote from said transverse member to said spaced lever members extending from the truck frame.

7. A method for converting a rigid bed truck having a passenger cab and hauling bed supported on a frame to a tilting bed truck where the truck bed may be tilted between an upright and horizontal configuration such that the relationship between the truck cab and bed when the bed is in the horizontal position is the same as prior to the conversion, comprising:

removing the truck bed from the frame, attaching two longitudinal members at spaced relationships to the underside rearward end of the truck bed, attaching a first plate member having an aperture therein to each longitudinal member, said plate member extending outwardly from the bottom to the truck bed, mounting two second plate members having an aperture therein to the rearward end of the truck frame such that the apertures in said second palte members are aligned with the apertures in said first plate member, inserting a pin through the apertures of said first and second plate members to permit relative rotation between said first plate members and said second plate members thereby effectuating a hinge between the truck bed and frame, mounting a support frame on the underside of the truck bed at its forward end, rotatably attaching a first arm to the frame such that the arm extends forwardly from the frame, rotatably attaching a second arm to the support frame on the underside of the truck bed such that the second arm extends forwardly from the truck bed, interconnecting the extended ends of the first and second arms by a third arm, connecting a hydraulic ram between the first and second arms such that by varying the length of the hydraulic ram the second arm moves substantially longitudinally against the truck bed to tilt the bed.

8. The attachment of claim 1 wherein said coupling member comprises:

a rectangular framed member including transverse sleeve members interconnected by parallel side members;

a first pin member fitted within said first sleeve member and interconnected between the ends of said first lever members remote from the connection of said first lever members to the truck frame; and a second pin member fitted within said second sleeve member and fixedly attached to the ends of said second lever members at the end of said second lever members remote from the connection of said second lever members to the truck bed.

9. An attachment for converting a fixed bed truck with a passenger cab and hauling bed supported on a frame to a tilting bed truck where the hauling bed may be rotated from a horizontal to a tilt position, such attachment permitting the passenger cab and hauling bed, when the bed is in the horizontal position, to assume the same relative position as before the conversion, comprising:

two hinge members fixedly attached between the rear underside of the hauling bed and the rear of the truck frame, each said hinge member including a longitudinal member fixedly attached to the underside of the truck bed, a first plate member having an aperture therein and rigidly attached to said longitudinal member, said first plate member extending perpendicularly from the bottom of the truck bed, a second plate member fixedly attached to the truck frame and having an aperture therein, the aperture in said second plate member being alignable with the aperture in said first plate member, and a pin member adapted for insertion through the apertures in said first and second plate members, said pin member being sized to permit relative rotation between said first plate member and said second plate member thereby permitting relative rotation between the hauling bed and frame, a rigid support rectangular frame affixed to the underside of said truck bed, channel members fixedly attached to said rigid frame, said channel members and said rectangular frame forming receptacles adjacent the underside of the hauling bed, spaced lever members each pivotally connected at one end to the forward portion of the frame and extending forwardly from the frame, a pair of spaced lever arms, each adapted with cylindrical ears at one end thereof for engagement in the receptacles formed by said channel members, a coupling member pivotally connected at opposite ends between said other ends of said lever members and lever arms, a variable length actuator arm interconnected between said lever members and said lever arms including a cylinder having one end connected to said lever members, a piston arm movable within said cylinder and having a portion extending therefrom and connected to said lever arms, and an orifice valve mounted on said cylinder for receiving fluid into said cylinder to extend said piston arm and thereby move said lever arms substantially longitudinally against the underside of the hauling bed to tilt the bed and for controlling the discharge of fluid from said cylinder to retract said piston arm and said lever arms to lower the truck bed, said valve preventing the sudden discharge of fluid from said cylinder thereby preventing sudden dropping of the truck bed.

10. The attachment of claim 9 wherein said coupling member includes a transverse member rotatably interconnecting the ends of said spaced lever arms remote from the connection of said spaced lever arms to the truck bed, a pair of side members extending from said transverse member, and means for rotatably connecting the ends of said side members remote from said transverse member to said spaced lever members extending from the truck frame.

* * * * *

UNITED STATES PATENT OFFICE
CERTIFICATE OF CORRECTION

Patent No. 4,019,781                    Dated April 26, 1977

Inventor(s) Louis M. Ray

It is certified that error appears in the above-identified patent and that said Letters Patent are hereby corrected as shown below:

Col. 1, line 17, "of", second occurrence read -- for --
       line 40, "u.S", should be --"U.S."--.
Col. 2, line 46, delete "the" (second occurrence).
Col. 5, line 66, "cylindrical", should be --"Cylindrical"--.
Col. 7, line 31, "to", second occurrence to read -- of --
       line 54,    after "92a'" insert -- 92b' --.
Col. 10, line 18, "to" should be --"of"--;
        line 22, "palte" should be --"plate"--.

Signed and Sealed this ninth Day of August 1977

[SEAL]

Attest:

RUTH C. MASON
Attesting Officer

C. MARSHALL DANN
Commissioner of Patents and Trademarks